Aug. 13, 1929.  V. S. REED  1,724,363
ROAD SCARIFIER
Filed July 19, 1926  2 Sheets-Sheet 2
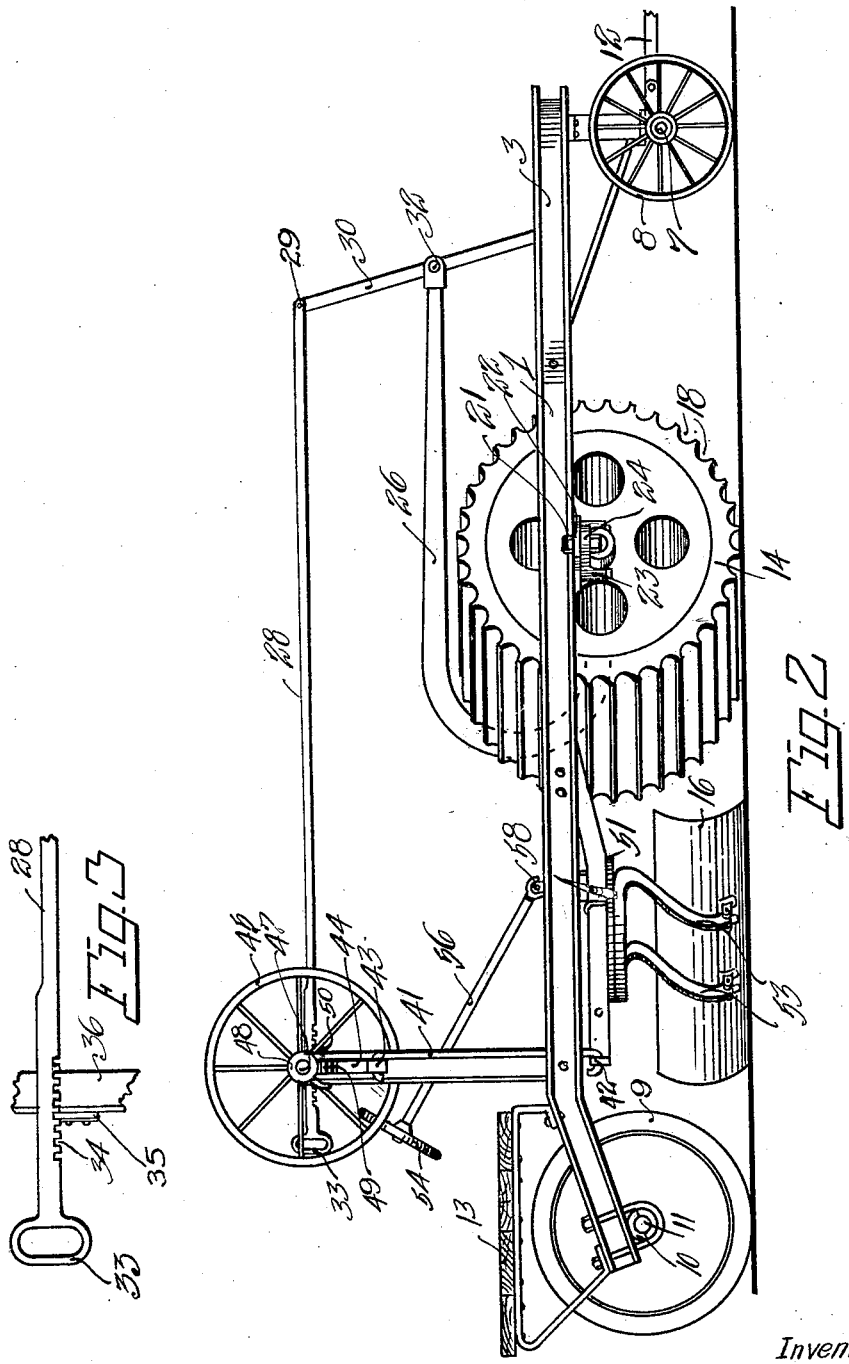
Inventor
Vett S. Reed
Herbert E. Smith
ATTORNEY Patented Aug. 13, 1929.

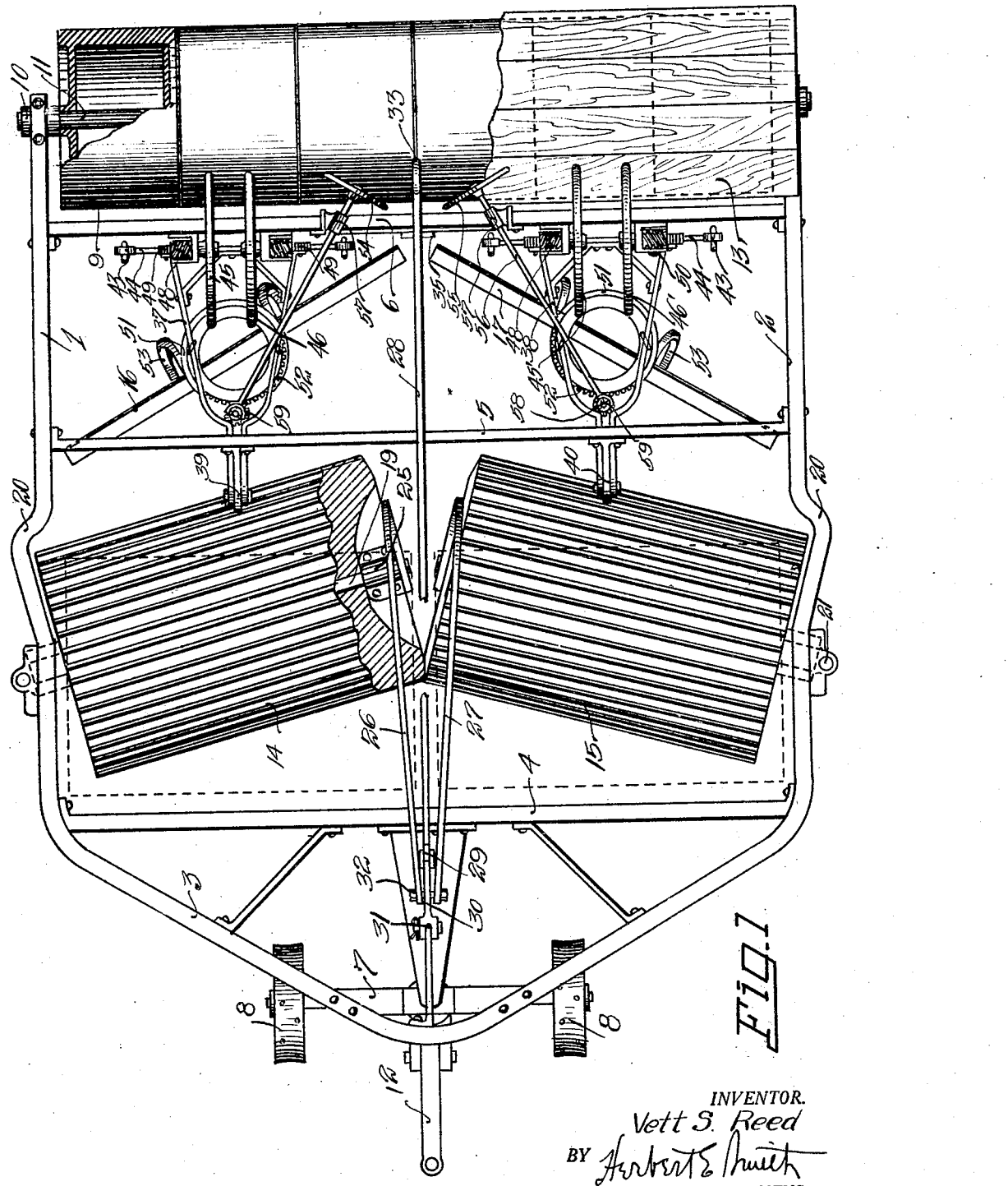

1,724,363

UNITED STATES PATENT OFFICE.

VETT S. REED, OF VALLEY, WASHINGTON.

ROAD SCARIFIER.

Application filed July 19, 1926. Serial No. 123,324.

My present invention relates to improvements in road scarifiers of the type embodying a four wheeled implement which may be horse-drawn or drawn by a tractor machine, and adapted for field work in the cultivation of the soil, as well for road building or highway maintenance. For convenience of illustration and description I have herein referred to the implement as a road scarifier which is provided with forwardly diverging rollers, preferably having a corrugated working surface for "slicing" the irregular top surface of a roadway, as a macadamized road. Means are provided for varying the divergent angle of the pair of rollers and at the rear of these rollers a complementary pair of transversely arranged, angularly adjustable scraper blades are supported, with means for their adjustment. At the rear of the implement is a transversely arranged packing roller having fixed journal bearings. By this combination and arrangement of features, the road-surface may be graded, scraped, levelled, and irregularities obliterated, and the several devices of the implement utilized as required for the accomplishment of the purpose.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a top plan view of an implement embodying the features of my invention, parts of two of the rollers being shown in section for convenience in illustration.

Figure 2 is a view in side elevation of the implement.

Figure 3 is a detail view of the adjusting rack for retaining the pair of complementary rollers in adjusted angular position.

In carrying out my invention I preferably utilize a U-shaped main frame having side bars 1 and 2 and the angular front beam 3, together with transverse braces 4, 5 and 6, all of suitable metal shapes and secured together to provide a rigid supporting structure.

At the front of the frame a steering truck is journaled and comprises an axle 7 and wheels 8, while the rear end of the implement is supported on the packing roller 9, which extends transversely of the implement and is journaled in bearings 10 at the rear ends of the side bars 1 and 2. Preferably the axle 11 of the packing roller extends longitudinally therethrough, and the roller, which is hollow and cylindrical, may be divided longitudinally into sections and is properly braced in its interior to insure a strong and durable packing agent for the implement.

When the vehicle or implement is horse-drawn, the horses are attached at the sides of the tongue 12, or it will readily be apparent that a tractor machine may be coupled to the implement for operating it. At the rear of the implement a platform 13 is arranged over the packing roller and supported above the main frame for the convenience of the operator in manipulating the control devices for the pair of rollers 14 and 15 and the scraper blades 16 and 17 located at the rear of the rollers.

While the rollers 14 and 15 may be adjusted in alinement transversely of the implement as indicated by dotted lines in Figure 1, they are especially adapted for relative angular adjustment to assume a forwardly diverging position as indicated by full lines in Figure 1. In this position the surfaces of the rollers, which are corrugated at 18, perform a "slicing" operation as they scarify the road-surface to eliminate irregularities thereon.

To permit adjustment of the rollers, their longitudinally extending shafts, indicated as 19, are journaled at their outer ends on the side bars of the frame, which bars are offset or outwardly bent as at 20 to accommodate the outer ends of the rollers.

At its outer end each roller is provided with a vertically arranged pivot pin or bolt 21 which is passed downwardly through a fixed lug 22 at the underside of the side bars, and a bearing block 23 for the shaft 19 is fashioned with a horizontal pivot lug 24 (complementary to the fixed lug 22) through which the pivot pin or bolt 21 also passes. At their adjoining inner ends the shafts of the rollers are provided with bearings as 25 carried at the rear ends of the longitudinally extending beams 26 and 27, which are located above the plane of the rollers, but have downwardly curved rear ends for the bearings 25 of the roller shafts.

The pair of rollers are adapted to be swung on their pivot pins 21 to bring the inner ends of the rollers to the rear of the transverse line between the pivot pins 21 for the purpose of angularly adjusting the rollers. This adjusting movement is accomplished by the driver or operator of the implement through the manipulation of a longitudinally extending rod 28 which is pivoted at its forward end 29 to the upright link 30. At its lower end this link is pivoted at 31 in a suitable fixed support on the main frame, and the two beams 26 and 27 are pivoted to the link or lever arm 30 on a single pin or bolt 32. In the detail drawing Figure 3 it will be seen that the rod 28 is provided with a handle 33 and a rack 34, the latter being adapted to engage the keeper plate 35 supported from the upright frame 36 of the implement. The rollers may thus be adjusted in various relatively angular positions for work upon the road-surface, and when the implement is being transported, or if the "slicing" or rotary scraping effect of the rollers is not desirable, the shafts of the rollers may be alined transversely of the implement, as indicated in dotted lines Figure 1 for straight travel.

The scraper blades 16 and 17 are adjustable to various relative horizontal positions, and also may be bodily elevated above the road surface when desirable. Each scraper blade is provided with a drag frame comprising angular bars 37 and 38 that converge toward the front of the implement and the drag frames are pivoted on horizontal pivots as 39 to lugs 40 attached at the front side of the cross brace 5 and fixed at equidistant points from the longitudinal center of the implement. At their rear ends, which are free, these drag-frames are provided with elevating or lifting means comprising hooked links 41 loosely connected at their lower ends 42 to the drag frames and at their upper ends 43 connected to a complementary pair of oppositely extending lever arms 44 which are adapted to swing outwardly and upwardly to elevate the drag frames.

The swinging movement of these two pairs of arms is accomplished for each drag frame by means of a pair of vertically disposed hand wheels 45 and 46 and 45' and 46' as indicated in Fig. 1.

By manipulating the wheels 45 and 45' the two blades may be tilted to elevate or depress their outer ends, and by manipulation of the inner wheels 46 and 46' the inner, adjoining ends of the two blades may be elevated or depressed, and for elevating or depressing the two blades, separately, both pairs of hand wheels are properly manipulated. For transferring the rotary movement of the wheels to the swinging movement of the side arms 44, the shafts 47 of the wheels which are journaled in the upright frame 36, are provided with worm screws 48 which co-act with gears 49 of the arms, and the latter are pivoted at 50 on the upright frame 36.

Each blade is also adapted to be rotated or oscillated in a horizontal plane to bring them to either rearwardly diverging position or forwardly diverging position (as in Figure 1) for scraping the road surface. For this purpose the drag frames are provided with circular, horizontal frames or rings 51 attached at the undersides of the frames, and the blades are provided with rack rings 52 complementary to the fixed rings and supported from the blades by the bars 53. For angularly adjusting the blades in connection with these rack rings, each blade has an operating hand wheel, as 54 and 55, and a shaft 56 journaled at 57 in the upright frame 36. At its lower end each shaft has a universal joint 58, and a pinion 59 for co-action with the rack rings 52, and it will be apparent that by turning the hand wheels 54 and 55 the scraper blades may be turned on their respective axes to forwardly diverging angular position, or angular position diverging rearwardly.

As thus constructed the implement may be adjusted for the performance of various functions in the treatment of the road surface, or for the surface of the soil under cultivation.

Having thus fully described my invention what I claim as new and desire to secure by Letters Patent is—

1. A main frame having a rear supporting roller and a steering truck, a pair of transversely disposed relatively and angularly adjustable rollers, and means for adjusting said rollers, a pair of complementary scraper blades, and means for adjusting said blades to alternate forwardly diverging or rearwardly diverging positions.

2. A main frame having offset side bars, a pair of rollers each having a pivoted journal bearing in a side bar, a pair of beams having pivoted journal bearings for the inner ends of said rollers, a pivoted supporting link for said beams, an operating rod for said link, and means for securing said rod in adjusted position.

In testimony whereof I affix my signature.

VETT S. REED.